United States Patent
Hurst

(10) Patent No.: US 10,642,937 B2
(45) Date of Patent: May 5, 2020

(54) INTERACTIVE ADDITION OF SEMANTIC CONCEPTS TO A DOCUMENT

(71) Applicant: Microsoft Technology Licensing, LLC, Redmond, WA (US)

(72) Inventor: Matthew Francis Hurst, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 593 days.

(21) Appl. No.: 15/431,399

(22) Filed: Feb. 13, 2017

(65) Prior Publication Data

US 2017/0169010 A1 Jun. 15, 2017

Related U.S. Application Data

(63) Continuation of application No. 12/893,116, filed on Sep. 29, 2010, now Pat. No. 9,582,503.

(51) Int. Cl.
*G06F 16/338* (2019.01)
*G06F 17/27* (2006.01)
(Continued)

(52) U.S. Cl.
CPC ........ *G06F 17/2785* (2013.01); *G06F 16/338* (2019.01); *G06F 16/3322* (2019.01);
(Continued)

(58) Field of Classification Search
CPC .................................................... G06F 16/338
See application file for complete search history.

(56) References Cited

U.S. PATENT DOCUMENTS

| 6,092,074 A | 7/2000 | Rodkin et al. |
| 7,739,304 B2 | 6/2010 | Naaman |

(Continued)

FOREIGN PATENT DOCUMENTS

WO 0156388 3/2002

OTHER PUBLICATIONS

Ahn et al., "Interleaving Ontology Mapping for Online Semantic Annotation on Semantic Wiki," Dec. 12, 2009, pp. 25-28, ACM International Conference on Web Intelligence and Intellgient Agent Technology, http://ieeexplore.ieee.org/stamp/stamp.jsp?arnumber=04740719.

(Continued)

*Primary Examiner* — Kris E Mackes

(57) ABSTRACT

One or more techniques and/or systems are provided for interactively associating a semantic concept with a unique term that is input by a user. As the user is creating a document and/or once the user has completed a draft of the document, the document is parsed to identify unique terms (e.g., persons, places, things, services, etc.) in the document. When a unique term is identified, a query is generated to locate one or more semantic concepts (e.g., URLs, URNs, or other identifiers, for example) that are associated with the identified unique term and a notification indicative of the results is generated. From this notification, the user can select whether to associate the unique term with any and/or all of the located semantic concepts. In this way, supplemental content may be added to a document that the user is creating, for example.

20 Claims, 8 Drawing Sheets

(51) Int. Cl.
*G06F 16/34* (2019.01)
*G06F 16/93* (2019.01)
*G06F 16/332* (2019.01)
*G06F 16/33* (2019.01)
*G06F 16/955* (2019.01)
*G06F 17/24* (2006.01)
*G06F 17/22* (2006.01)
*G06F 3/0482* (2013.01)

(52) U.S. Cl.
CPC .......... *G06F 16/3334* (2019.01); *G06F 16/34* (2019.01); *G06F 16/94* (2019.01); *G06F 16/9566* (2019.01); *G06F 17/2235* (2013.01); *G06F 17/241* (2013.01); *G06F 17/2705* (2013.01); *G06F 17/2765* (2013.01); *G06F 3/0482* (2013.01)

(56) References Cited

U.S. PATENT DOCUMENTS

| | | | | |
|---|---|---|---|---|
| 8,219,519 | B2* | 7/2012 | Chakrabarty | G06Q 10/06 707/602 |
| 9,582,503 | B2 | 2/2017 | Hurst | |
| 2003/0229845 | A1 | 12/2003 | Salesin et al. | |
| 2004/0186705 | A1 | 9/2004 | Morgan et al. | |
| 2006/0129591 | A1 | 6/2006 | Ramsey | |
| 2007/0233668 | A1 | 10/2007 | Osipov | |
| 2008/0228749 | A1 | 9/2008 | Brown | |
| 2009/0077094 | A1 | 3/2009 | Bodain | |
| 2009/0234640 | A1 | 9/2009 | Boegl | |
| 2010/0042910 | A1 | 2/2010 | Manolescu | |
| 2010/0145678 | A1 | 6/2010 | Csomai | |
| 2010/0169095 | A1 | 7/2010 | Asano | |
| 2010/0251086 | A1 | 9/2010 | Haumont et al. | |

OTHER PUBLICATIONS

Sharif, "Combining ontology and folksonomy: An Integrated Approach to Knowledge Representation," 2009, pp. 1-13, http://www.ifla2009satelliteflorence.it/meeting3/program/assets/AtefehSharif.pdf.

Vehvilainen, "A Semi-Automatic Semantic Annotation and Authoring Tool for a Library Help Desk Service," 2006, 9 pages, http://www.seco.tkk.fi/publications/2006/vehvilainen-hyvonen-alm-semi-automatic-semantic-annotation-and-authoring-tool.pdf.

U.S. Appl. No. 12/893,116, Office Action dated Jul. 23, 2012, 16 pages.

U.S. Appl. No. 12/893,116, Office Action dated Feb. 14, 2013, 13 pages.

U.S. Appl. No. 12/893,116, Office Action dated Jun. 20, 2013, 16 pages.

U.S. Appl. No. 12/893,116, Office Action dated Oct. 2, 2013, 16 pages.

U.S. Appl. No. 12/893,116, Office Action dated Feb. 26, 2014, 16 pages.

U.S. Appl. No. 12/893,116, Office Action dated Apr. 6, 2015, 14 pages.

U.S. Appl. No. 12/893,116, Office Action dated Dec. 17, 2015, 17 pages.

U.S. Appl. No. 12/893,116, Office Action dated Mar. 24, 2016, 14 pages.

U.S. Appl. No. 12/893,116, Amendment and Response filed Oct. 23, 2012, 11 pages.

U.S. Appl. No. 12/893,116, Amendment and Response filed May 14, 2013, 13 pages.

U.S. Appl. No. 12/893,116, Amendment and Response filed Sep. 20, 2013, 13 pages.

U.S. Appl. No. 12/893,116, Amendment and Response filed Jan. 2, 2014, 13 pages.

U.S. Appl. No. 12/893,116, Amendment and Response filed May 27, 2014, 15 pages.

U.S. Appl. No. 12/893,116, Amendment and Response filed Mar. 26, 2015, 15 pages.

U.S. Appl. No. 12/893,116, Amendment and Response filed Sep. 4, 2015, 13 pages.

U.S. Appl. No. 12/893,116, Amendment and Response filed Mar. 17, 2016, 15 pages.

U.S. Appl. No. 12/893,116, Amendment and Response filed Jul. 25, 2016, 16 pages.

U.S. Appl. No. 12/893,116, Notice of Allowance dated Oct. 24, 2016, 7 pages.

* cited by examiner

INTERACTIVE ADDITION OF SEMANTIC CONCEPTS TO A DOCUMENT

CROSS-REFERENCE TO RELATED APPLICATIONS

This application is a continuation application and claims priority to U.S. patent application Ser. No. 12/893,116, filed Sep. 29, 2010, entitled "INTERACTIVE ADDITION OF SEMANTIC CONCEPTS TO A DOCUMENT," now issued U.S. Pat. No. 9,582,503, which application is incorporated herein by reference in its entirety.

BACKGROUND

Today, people from all walks of life publish content on the web. For example, many people write blogs or microblogs that discussing everything from their daily activities, to scientific breakthroughs, to commentary on recent newsworthy events. Others still publish articles related to a topic that they believe will somehow serve a public need, such as how-to manuals, for example. Commonly, once these posting are published, a webhost or other provider will search the content for unique terms and tag the term with a link and/or annotation. These links and/or annotations might help a user understand the context and/or meaning of the unique term, may relate to a product the webhost is paid to advertise, and/or may provide some other relevant information to a reader of the posting. For example, annotations are commonly inserted by a webhost and/or an advertising company associated with the webhost to surface advertisements that are relevant to the topic of the posting, and thus are targeted to the readers of the posting. When a reader selects the unique term, or hovers over the term, a box containing the annotation appears and provides the reader with the additional content related to the unique term.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for suggesting to an author semantic concepts (e.g., a unique identifier such as a URN, URL, etc.) that can be inserted into a document the author is creating are provided herein. Stated differently, as an author is creating a document (e.g., a web article, blog, etc.), unique terms can be identified, and semantic concepts related to the identified terms can be suggested to the author. The author can choose one or more semantic concepts that can be associated with the respective identified unique term(s). In one embodiment, the semantic concepts can be inserted into the document as annotations, which surface when a reader of the document selects the unique term.

Sometimes, a semantic concept that the user wants to associate with a unique term is unavailable. For example, some unique terms may have no semantic concepts associated with them and/or the semantic concepts that are associated with a unique term may be inappropriate/undesirable for the author's document. In these and other circumstances, the author may create a semantic concept for the unique term (which can then be stored for later use the author and/or other authors). Thus, where a desired semantic concept does not exists, an author can create a semantic concept that can be inserted into the document as an annotation, for example.

It will be appreciated that the systems and/or techniques described herein provide benefits to the author, readers of the content, and to aggregators of the content. Authors benefit through the interaction (e.g., semantic concepts are suggested to the author rather than being automatically inserted into the document). Thus, the author plays an active role in determining what terms are further defined through annotations. Readers and aggregators benefit because the author (e.g., as opposed to a computer algorithm) selects the semantic concepts that better define the unique terms in his or her document. Thus, the semantic concepts that are displayed may be more relevant to the content of the document, and the aggregators may have more information to use when indexing the document and/or when determining whether to surface the document as a result of a search query.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
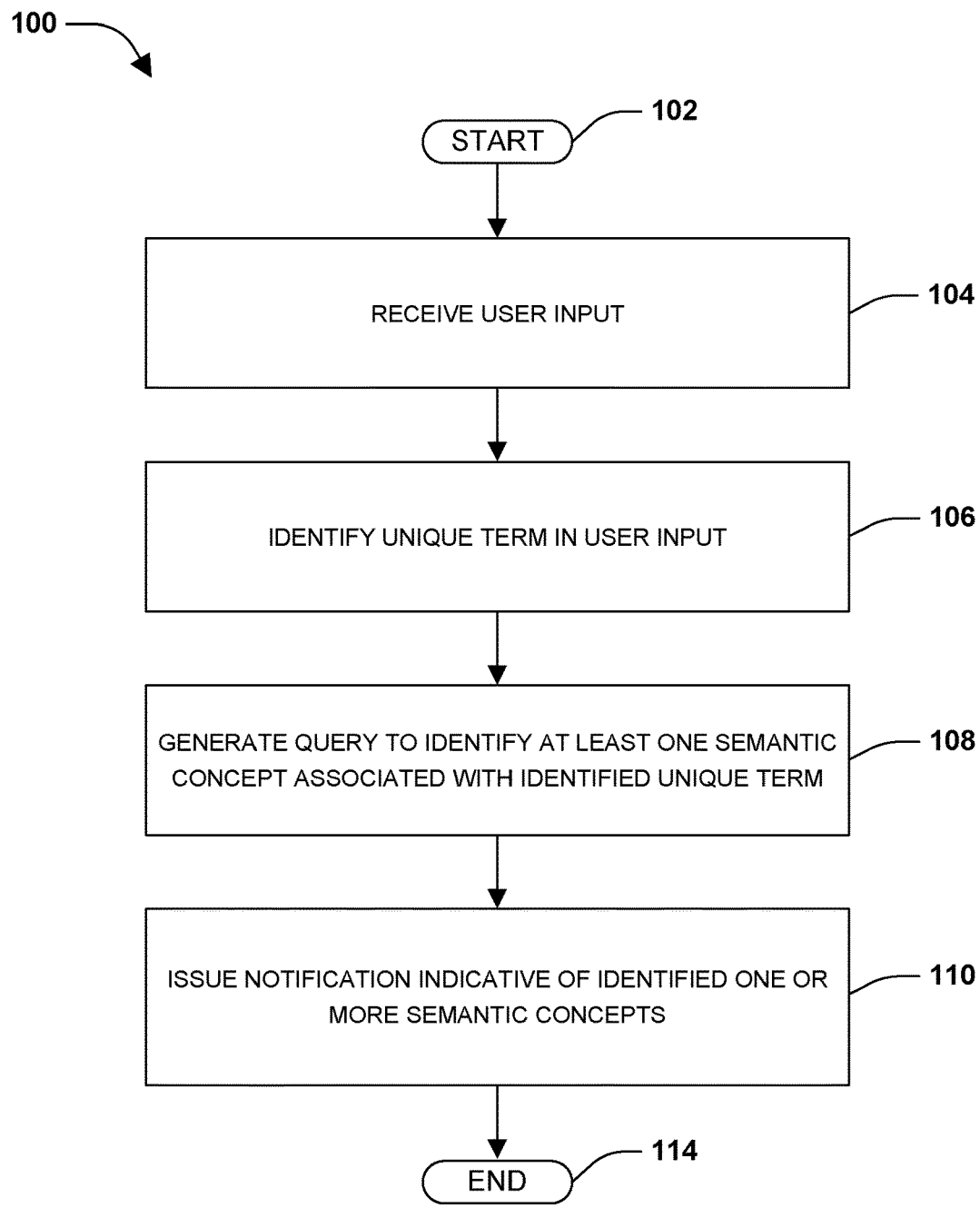
FIG. 1 is a flow chart illustrating an exemplary method of identifying one or more semantic concepts based upon an identified unique term comprised in user input.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Presently, there is not an easy way for an author, particularly an author of a document that is published on the web, to create annotations that associate previously created ideas (e.g., semantic concepts) with unique terms or identifiers in the document that author is creating. For example, to insert a hyperlink to a webpage about a topic that the author is discussing, the author has to know that the webpage exists and know the address of the webpage. There is believed to be no tool that can parse the document and generate suggestions (e.g., suggested websites) about content that the author may wish to incorporate into his or her document (e.g., as annotations). Thus, the document's content is limited to the knowledge that the author possesses at the time the document is created.

Recently, webhosts of documents that are published on the internet have been attempting to insert additional information (e.g., generally in the way of advertisements), that is related to the content of the document. For example, a webhost may search a document to identify unique terms in the document and may surface ads (e.g., as annotations to select terms) that are related to the unique term and/or the content of the document. While such techniques have provided a mechanism for content to be added to the document, the techniques do not allow the author of the document to exercise control over the addition of such content. Generally, they are automatically inserted without human review and/or acceptance, and thus they may not accurately relate to the content the author created (e.g., the annotated information may be unrelated to the authored created content).

Accordingly, one or more systems and/or techniques for identifying unique terms in an author created document and interactively selecting semantic concepts (e.g., which may be inserted into the document as annotations) are provided. Stated differently, a document the author is creating is parsed to a identify unique term(s), and, one or more semantic concepts (e.g., URNs, URLs, etc.) are identified based upon the identified unique term(s). A list of one or more semantic concepts associated with the identified unique term(s) may be provided to the author, and the author can select a semantic concept, which may be inserted into the author created document (e.g., as an annotation). It will be appreciated that in one embodiment, the acts of identifying unique terms, identifying semantic concepts, and providing the semantic concepts to the author may be performed in real-time (e.g., as the author is typing the document). In another embodiment, the acts may be performed after the author has finished typing an initial draft of the document (e.g., the author may press a button that initiates the aforementioned acts).

FIG. 1 illustrates an example method 100 for interactively inserting semantic concepts into an author created document. The method 100 begins at 102, and user input is received at 104. In one embodiment, the user (e.g., an author) inputs information into a client device (e.g., a personal computer) through an input of the client device (e.g., a keyboard, mouse, touch screen, etc.). The user inputted information is displayed to the user on a document creation interface, such as a word processing interface, for example, where the user can view the document and/or make edits to the document, for example.

In one embodiment (e.g., to identify relevant semantic concepts), the user inputted information is also sent from the client device to a server device (e.g., where a server device is operably coupled to a plurality of client devices). Thus, it can be said that the server device receives the user input from the client device. It will be appreciated to those skilled in the art that the user inputted information may be sent to the server device in real-time (e.g., as the author is inputting the information), in periodic intervals, and/or upon request (e.g., the author presses a button on the document creation interface that causes the information to be sent to the server device).

At 106, unique terms in the user input are identified. It will be appreciated the phrase "unique terms" is used broadly herein to refer to terms that are used as identifiers. For example, places, persons, and/or things that are mentioned in the document may be considered to be unique terms. It will be appreciated that the mere fact that a term is used numerous times in a document does not necessarily mean that it is not unique. Rather, the term "unique" merely implies that someone, reading the document, would associate that word or phrase with a particular thing, place, person, service, etc. Moreover, it will be appreciated that the word "term" is used herein is to be construed to mean a word and/or a phrase. That is, the word "term" is not intended to be limited to a single word. Rather, in some embodiments, a phrase may be identified as unique. For example, "George Washington" (e.g., two words) may be identified as a unique term.

Generally, unique terms are identified by parsing the document using analytic and/or iterative techniques known to those skilled in the art. For example, in one embodiment, the terms in the document are compared with a list of predefined unique terms. Terms in the document that substantially match a predefined unique term are identified as unique terms. In another embodiment, unique terms are identified based upon the frequency of use of the terms. For example, terms that are comprised in less than a predefined threshold (e.g., 3%) of documents posted to the internet, intranet, etc. may be identified as unique terms. In yet another embodiment, proper names are identified as unique terms based upon the capitalization of the term in the document, for example. It will be appreciated that the techniques described herein are merely example techniques of identifying unique terms and other techniques that are known to those skilled in the art are also contemplated. That is, other techniques which identify unique terms (e.g., proper nouns) in a document, or rather in user input, may also be used herein.

In one embodiment, where a unique term is not identified using iterative and/or analytic techniques, the user may be given the option to identify terms in the document as unique (e.g., a user-override). For example, in one embodiment, where computer software determines that a term is not unique, a user may right-click on the term and select an option that makes the term unique. In this way, virtually any term in the document the user is creating can be classified as unique (e.g., such that semantic concepts associated with the term can be queried), regardless of the classification of the term that is made by the an automatic identification technique, for example.

At 108 a query is generated to identify at least one semantic concept associated with the identified unique term. That is, once the unique terms are identified, a search (e.g., of a database of semantic concepts) is performed to identify one or more semantic concepts which are associated with the identified unique term. It will be appreciated that as used herein, the phrase "semantic concept" refers to unique identifiers, such as URNs and/or URLs, for example, that comprise information and/or direct a user to information related to and/or associated with the identified unique term. For example, where the name of a person is comprised in the document (e.g., and identified as a unique term) a search may be performed to identify semantic concepts associated with the name of the person, such as a URL directed to a wiki article about the person, a URL directed to a personal website of the person, a biography of a person (e.g., which may be pulled from a social networking page dedicated to the person), etc.

At 110, a notification indicative of one more identified semantic concepts is issued if at least one semantic concept associated with the unique term is identified from the query. The notification generally comprises the semantic concept and/or information related to the semantic concept. For example, the notification may comprise a URL to a wiki article about an identified person. In another embodiment, the notification may comprise directions on how to access the semantic concept. For example, where biography information about the identified person is comprised on a webpage that requires user authentication to access the data, the notification may comprise instructions on how to access (e.g., and copy) the biography information from the webpage and/or how to copy the information from the webpage to the document that the user (e.g., author) is creating.

The notification that is issued can be presented to the user in the document creation interface. For example, in one embodiment, the identified unique term(s) is highlighted, distinguished, or otherwise made to stand out from adjacent text in the document creation interface and a bubble appears adjacent to the unique term that comprises the notification. The user may then be given the option to ignore the notification and/or to select one or more of the semantic concepts from the notification. If the user selects a semantic concept(s), the selected concept may be associated with the received user input. For example, in one embodiment, the selected concept may be inserted into the document as an annotation to the unique term. When a reader of the document selects, hovers over, or otherwise points to the unique term, the annotation may appear (e.g., providing the user with additional information on the unique term, such as an ability to link to the information, for example).

It will be appreciated that in one embodiment, a user is given the option to create a new semantic concept for an identified unique term that is not associated with any semantic concepts, for an identified unique term that is not associated with a desired semantic concept, etc. For example, where a term is identified as unique, but no semantic concepts are identified that are associated with the identified unique term, a notification may be issued and presented to the user that indicates that a unique term was identified but no semantic concepts were associated with the unique term. The user may then have the option to create a semantic concept for the identified unique term. In another example, a plurality of semantic concepts may be associated with the identified unique term and may be presented to the user, but the presented concepts may not be desirable to the user. Thus, the user can create a more desired semantic concept which can be associated with the unique term (e.g., which can be stored as an annotation in the document).

It will be appreciated that where the user creates a new semantic concept, the new semantic concept may be associated with the unique term and stored (e.g., in a database of semantic concepts) for later use by the user and/or by other users/authors. In this way, when the user and/or another user creates a document comprising the unique term, the semantic concept may be identified and presented to the user for use as an annotation in the document, for example.

It will be appreciated to those skilled in the art that the example method 100 described herein may be performed in real-time as the user is creating the document and/or at set or random intervals. For example, as the user is creating the document, unique terms may be identified (e.g., by highlighting the term), and suggested semantic concepts associated with the unique term may be presented to the user for insertion into the document (e.g., as annotations). In another embodiment, such identification and/or suggestions is not made until after a draft of the document is created and the user manually requests that semantic concepts associated with unique terms be presented (e.g., by selecting a button that begins the acts herein described). In yet another embodiment, unique terms are identified and/or semantic concepts are presented at predetermined, periodic intervals (e.g., every 5 minutes the document is scanned to identify unique terms). Thus, the acts described herein may be performed virtually any time during the creation of the document and/or after the creation of the document.

At 114 the example method 100 ends.

FIGS. 2-7 illustrate an example of a document creation interface 200, which may display user inputted text, identified unique terms, and/or a notification indicative of semantic concepts associated with an identified unique term. Such a document creation interface 200 may be used in conjunction with word processing software, website publishing software, etc.

Figure 2:
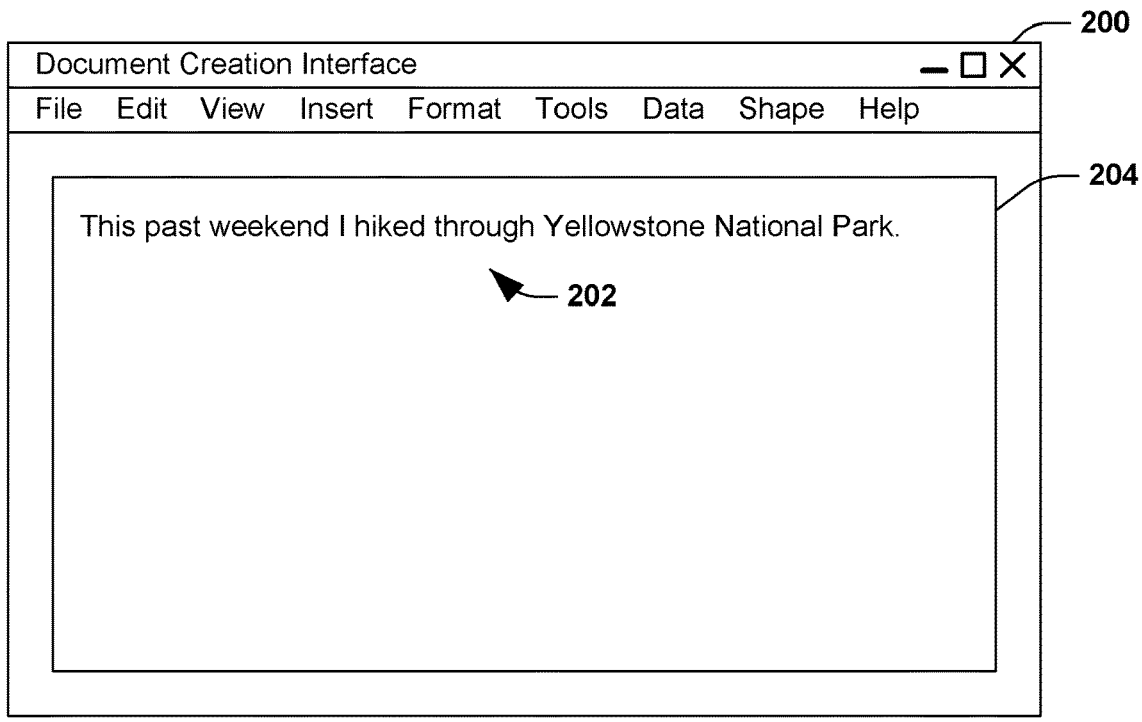
FIG. 2 is an exemplary document creation interface comprising user inputted text.

In FIG. 2, a user has begun inputting text 202 that is displayed in a text box 204 comprised within the document creation interface 200. Here, the text reads "This past weekend I hiked through Yellowstone National Park."

Figure 3:
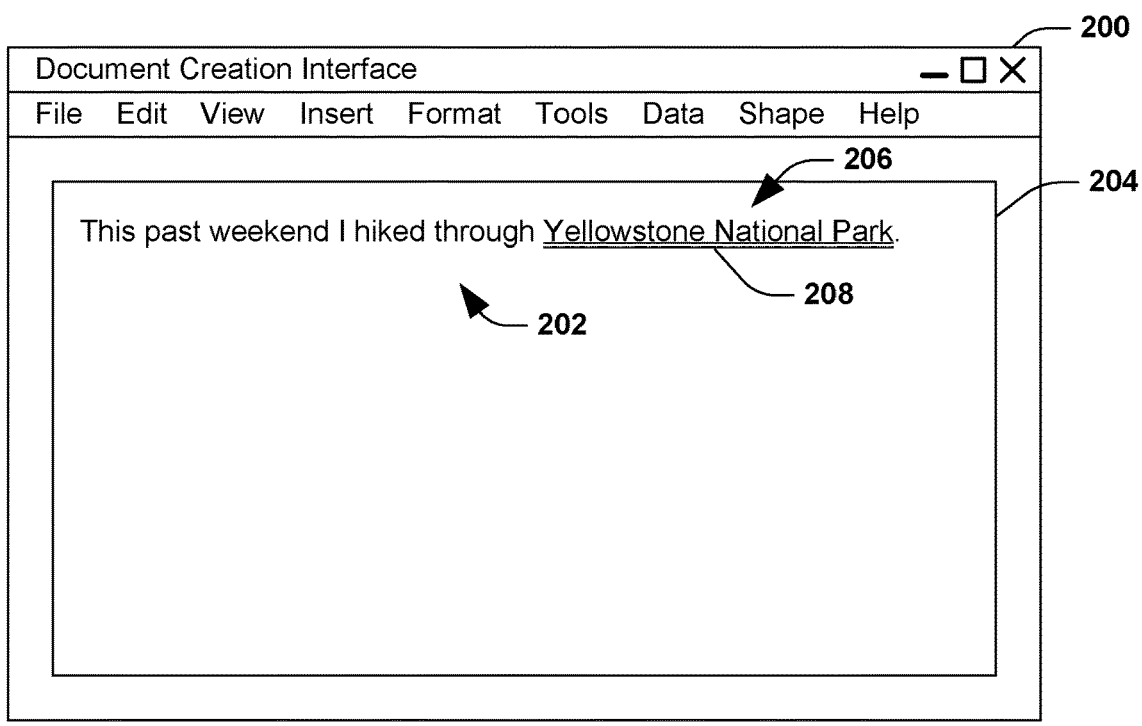
FIG. 3 is an exemplary document creation interface comprising an identified unique term.

In FIG. 3, the phrase "Yellowstone National Park" 206 is identified as a unique term and is distinguished 208 as a unique term (e.g., by double underlying the term) in the document creation interface 200. It will be appreciated that while the unique term is distinguished herein using double underlying, other techniques may be used to distinguish the unique term. For example, the term may be highlighted, bolded, and/or the font of the unique term may be altered to distinguish the unique term from other terms in the text box 204.

It will be appreciated that numerous techniques for identifying unique terms are known to those of skill in the art. For example, in one embodiment, the text 202 comprised in the text box 204 is compared to predetermined unique terms, and if a portion of the text 202 matches a predefined unique term, that matching portion of the text 202 is identified, or classified, as a unique term. In another example, unique terms, such as proper names, places, and/or things, for example, may be classified based upon their capitalization in the text box 204. In yet another embodiment, other analytic and/or iterative techniques known to those skilled in the art may be combined with the aforementioned techniques and/or used instead of the aforementioned techniques to identify unique terms in the text 202.

Figure 4:
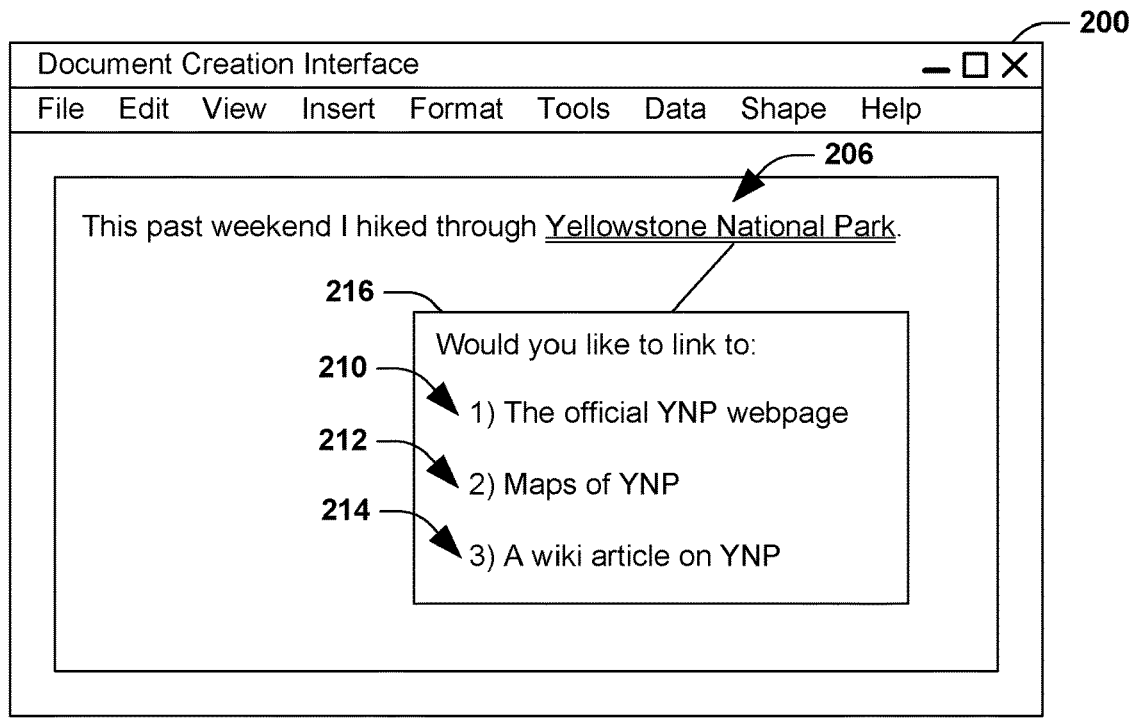
FIG. 4 is an exemplary document creation interface comprising a notification indicative of identified semantic concepts.

Once a unique term is identified, semantic concepts associated with the unique term may be identified (e.g., based upon a query of a database comprising semantic concepts) and presented to the user. FIG. 4 illustrates a document creation interface 200 wherein a bubble or box 216 comprising identified semantic concepts 210 associated with the unique term may be presented to the user. As illustrated, three semantic concepts 210, 212, 214 are associated with the identified unique term "Yellowstone National Park" 206 and are presented to the user. These comprise a link to the official Yellowstone National Park webpage 210, a map illustrating the location of Yellowstone National Park 212, and a link to a wiki article on Yellowstone National Park 214. From these semantic concepts 210, 212, 214 the user may select one or more semantic concepts, and the selected concept(s) may be associated with the identified unique term "Yellowstone National Park" 206, for example, as illustrated in FIG. 6.

Figure 5:
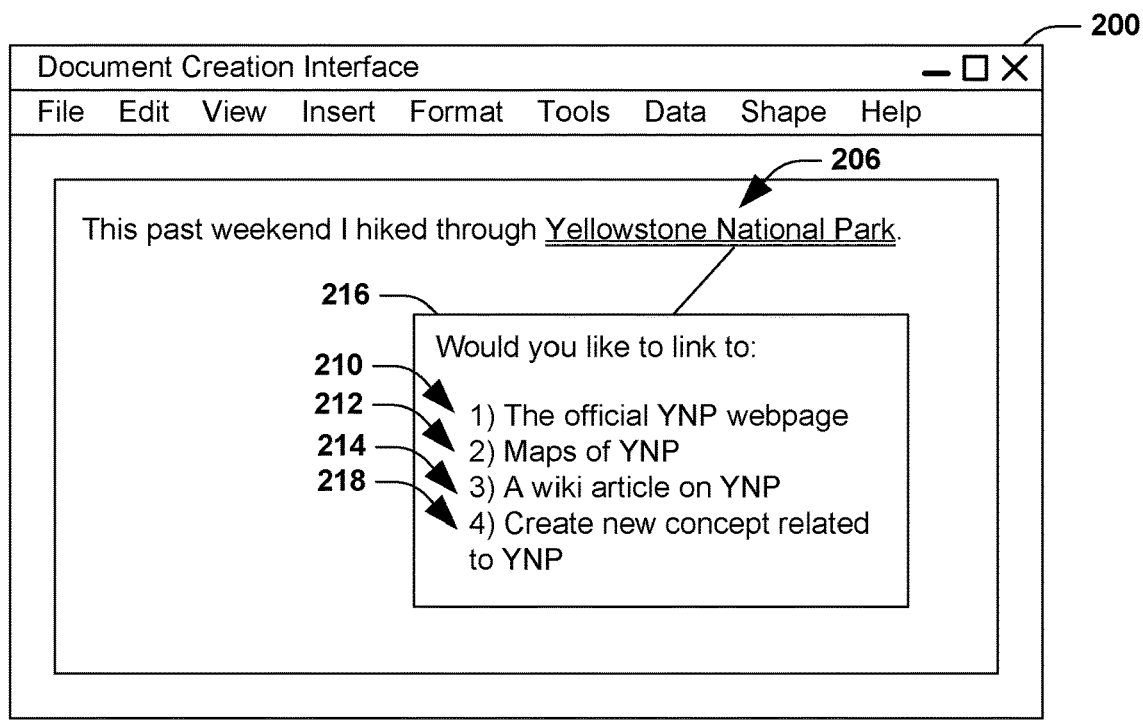
FIG. 5 is an exemplary document creation interface comprising a notification indicative of identified semantic concepts.

FIG. 5 shows an alternative embodiment of the document creation interface 200 illustrated in FIG. 4. Specifically, the box 216 comprising the identified semantic concepts 210, 212, 214 associated with the unique term "Yellowstone National Park" 206 further comprises an option 218 to create a new semantic concept related to the identified unique term "Yellowstone National Park" 206. In this way, a user can create a semantic concept for a unique term where no semantic concepts are associated with the identified unique term and/or where the identified semantic concepts 210, 212, 214 are not appropriate to the user (e.g., they do not comprise the information the user wants to associate with the identified unique term). Thus, the user can select an option 218 to create a new semantic concept and insert a link, map, description, etc. that is associated with the identified unique term "Yellowstone National Park" 206. When a reader, for example, selects the unique term, the newly created semantic concept may appear as an annotation in the document, for example. In one embodiment, where such an option 218 to create a new semantic concept is selected and a new semantic concept is created by the user, the newly created semantic concept can be stored with other semantic concepts (e.g., in a semantic concept database) for later use by the user and/or another user, for example.

Figure 6:
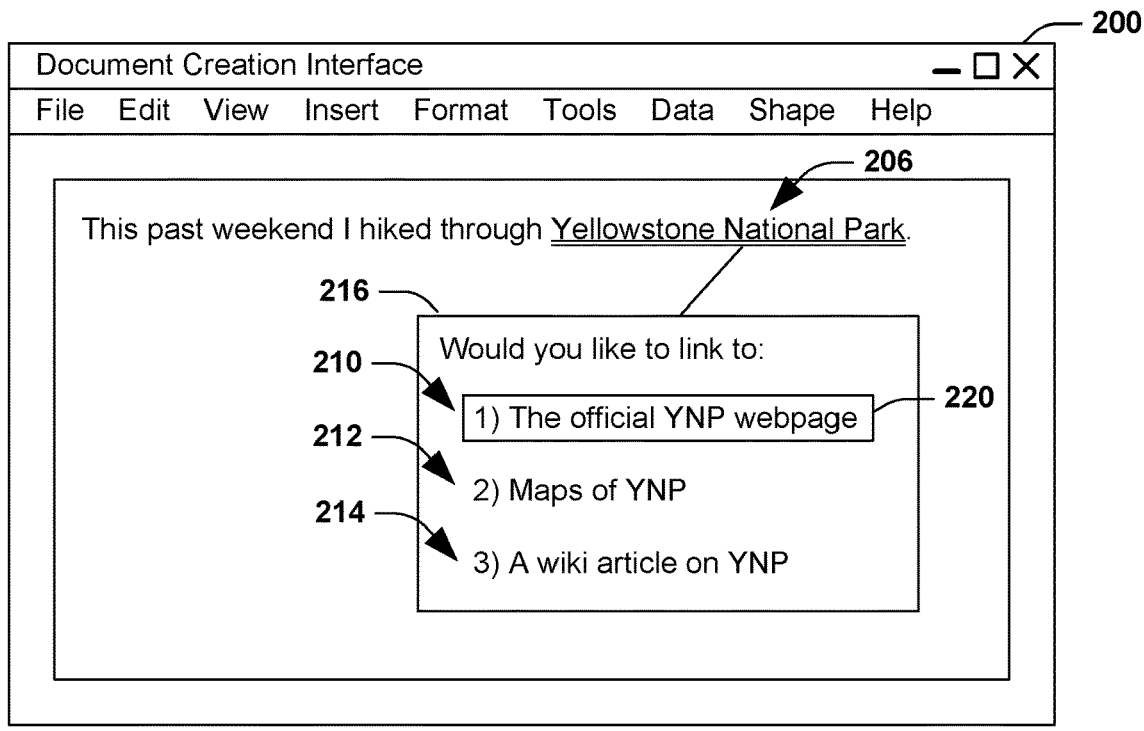
FIG. 6 is an exemplary document creation interface illustrating a selection of an identified semantic concept.

FIG. 6 illustrates the selection 220 of a semantic concept 210 on the example document creation interface 200. Stated differently, FIG. 6 provides an illustration of the document creation interface 200 as the user is selecting a semantic concept 210 from the list of semantic concepts 210, 212, and 214 illustrated in FIGS. 4-5. As illustrated, the user is selecting to associate a link to the official Yellowstone National Park webpage 210 with the unique term "Yellowstone National Park" 206.

Figure 7:
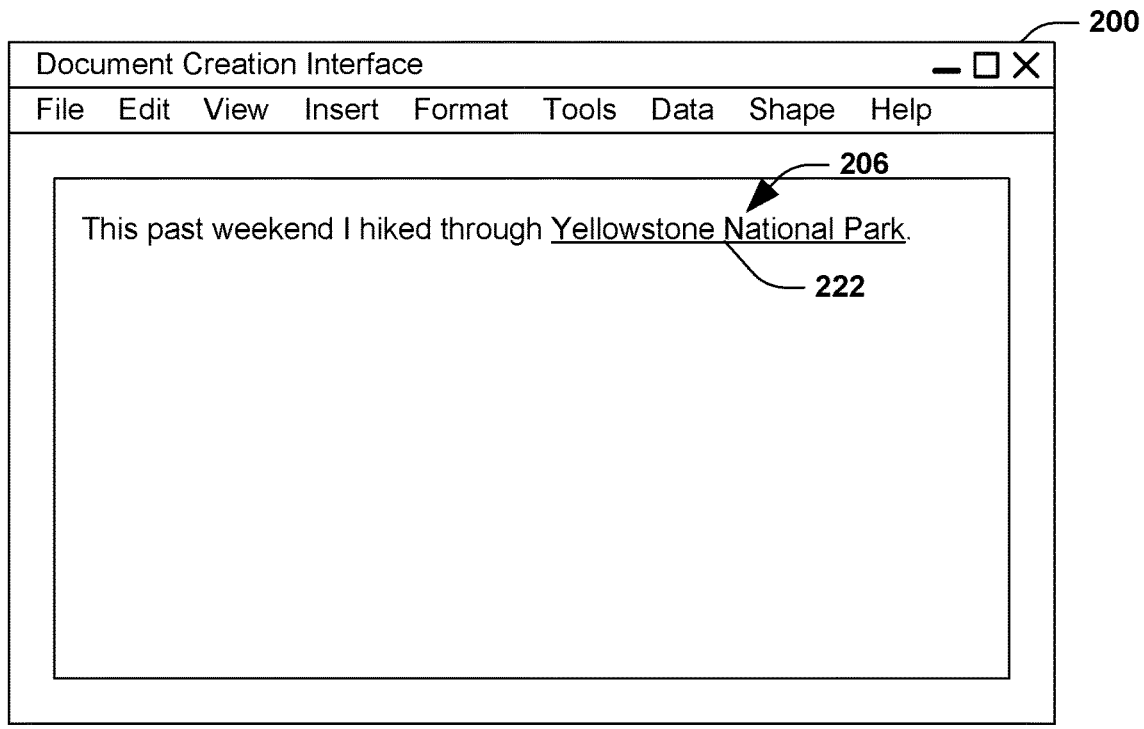
FIG. 7 is an exemplary document creation interface illustrating a selected semantic concept being associated with an identified unique term.

FIG. 7 illustrates the example document creation interface 200 after a semantic concept 210, 212, 214 has been selected and associated with the identified unique term "Yellowstone National Park" 206. As illustrated, the text of the identified unique term may change to illustrate that such an association has been made. For example, in FIG. 7, the term is underlined 222 to illustrate that a semantic concept is associated with the term. In this way, the term is distinguished from remaining text such that a reader of the document will know to select or hover over the unique term to be presented with more information related to the unique term. For example, in one embodiment, if a reader were to select the term "Yellowstone National Park" 206, the user may be presented with a box, for example, that comprises a link to the official Yellowstone National Park webpage and/or navigated to the official Yellowstone National Park webpage because the user (e.g., the author) selected to associate the unique term with that particular webpage.

Figure 8:
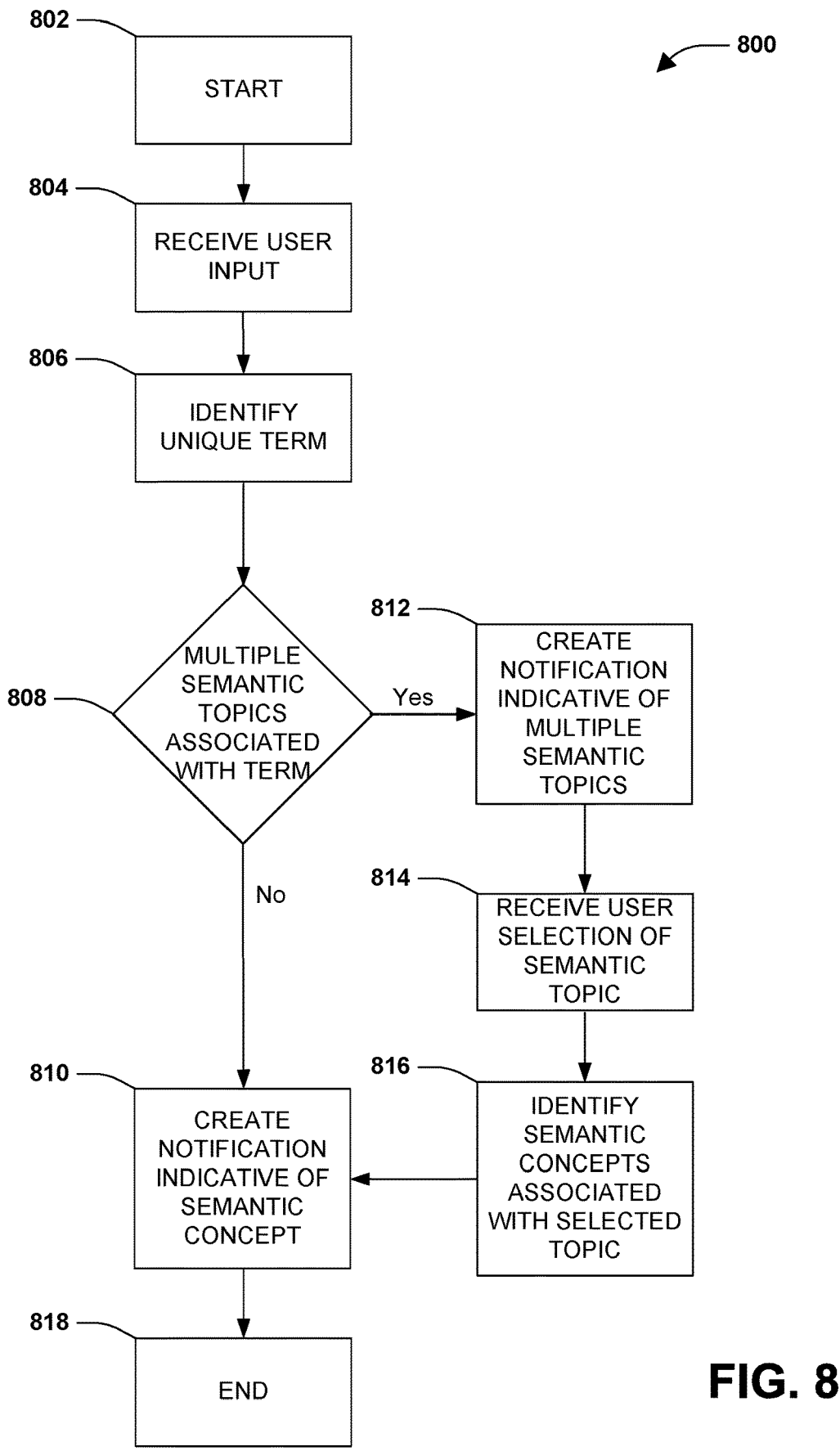
FIG. 8 is a flow chart illustrating an exemplary method for identifying one or more semantic concepts when a plurality of semantic topics are identified based upon an identified unique term.

In some circumstances, a term may be identified as unique, but multiple semantic topics or categories, respectively comprising a plurality of semantic concepts, may be associated with the unique term. For example, if a user were to enter the term "Washington," it may be unclear whether the user is referencing the state of Washington, Washington D.C., or George Washington, for example. Thus, in one embodiment, the semantic topic (e.g., which Washington") the user is referencing might be determined before a notification indicative of semantic concepts associated with the unique term "Washington" is issued (e.g., such that the notification is indicative of semantic concepts that may be useful to the user). FIG. 8 illustrates an example method for determining which semantic topic a user is referencing when an identified unique term is associated with multiple semantic topics. The method begins at 802, and user input is received at 804. For example, in one embodiment, user input is received on a client device and sent from the client device to a server device, where it is received by the server device. Thus, it may be said that the user input is received at the client device and/or at the server device.

At 806 a unique term is identified. As described above, in one embodiment, the term is identified using analytic and/or iterative techniques known to those skilled in the art. For example, the text of the received user input can be parsed to identify terms that match terms that are comprised in a predetermined list of unique terms. In another embodiment, a user may specify that a term is unique (e.g., by right clicking on the term and selecting a menu option that identifies the term as unique).

At 808 it is determined whether multiple semantic topics are associated with the identified unique term. It will be appreciated that the phrase "semantic topics" is used herein broadly to mean categories of interest (e.g., generally people, places, things, services, etc.). Respective semantic topics may comprise a plurality of semantic concepts. For example, "George Washington" may be considered to be a semantic topic and associated with the topic "George Washington" may be a plurality of semantic concepts related to the topic of George Washington. For example, associated with the topic "George Washington" may be a first semantic concept (e.g., a URL) pointing to wiki article on George Washington, another semantic concept (e.g., URL) may be pointing to a presidential biography on George Washington, etc. Thus, respective topics may be associated a plurality of semantic concepts.

If there are not multiple semantic topics associated with the identified unique term, a notification indicative of one or more semantic concepts associated with the unique term is created at 810 (e.g., as described with respect to FIG. 1). For example, if the unique term that was identified at 806 was "George Washington," a notification indicative of semantic concepts may be created at 810 unless there are multiple topics associated with the term "George Washington."

If there are multiple semantic topics associated with the identified unique term, a notification indicative of the multiple semantic topics is created at 812. For example, if the identified unique term is "Washington," multiple semantic topics may be identified, such as the state of Washington, Washington D.C., and George Washington. If it is unclear which topic the user is referring to in the received user input, a notification indicative of at least two possible topics may be created and presented to the user so that the user can choose the correct topic.

At 814 a user selection of a semantic topic is received. In this way, the user selects which topic the user is referring to in the received user input (e.g., which allows the scope of the semantic concepts that are presented to the user to be narrowed). For example, the user may be presented with the notification that was created at 812 and given the option to choose one semantic topic from the list of identified semantic topics.

At 816 semantic concepts associated with the selected topic are identified. That is, once it is known which semantic topic the user is referring to, a query can be performed to identify semantic concepts associated with the selected semantic topic. For example, if the user selects the semantic topic "Washington D.C." based upon the notification indicative of the two or more possible topics, one or more semantic concepts associated with the topic "Washington D.C." may be identified.

Once semantic concepts associated with the selected semantic topic are identified at 816, a notification indicative of the one or more identified semantic concepts associated with the selected semantic topic may be created at 810. The created notification can then be presented to the user and the user can select a semantic concept to associate with the unique term (e.g., as described with respect to FIG. 1).

The example method 800 ends at 818.

Figure 9:
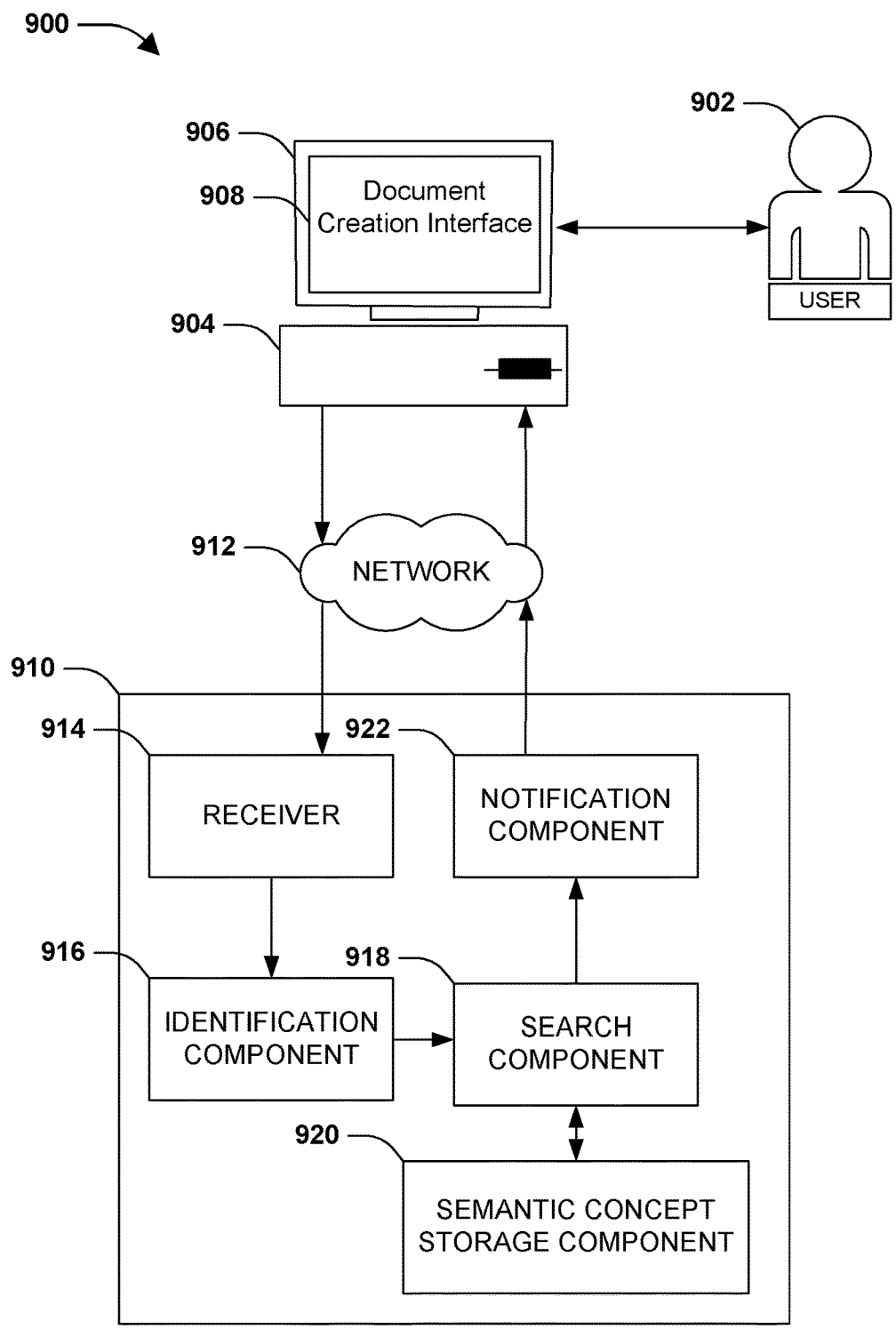
FIG. 9 is an exemplary system for identifying one or more semantic concepts based upon an identified unique term comprised in user input.

FIG. 9 illustrates an example system 900 that may be used to interactively associate semantic concepts with unique terms in a document that a user 902 is creating.

The system 900 comprises a client device 904 (e.g. a personal computer) that is configured to receive user input from the user 902. For example, the user may enter text into a keyboard operably coupled to the client device 904 and/or may use a mouse to navigate within a graphical user interface displayed on a monitor 906 of the client device 904. The monitor 906 is configured to display the received user input in a document creation interface 908, which may be part of a word processing program and/or a web publishing program that is configured to be executed via a microprocessor comprised in the client device 904, for example.

In one embodiment, the client device 904 is configured to send the user input, or at least a portion of the user input, to a server device 910 that is part of the exemplary system 900 and is operably coupled to the client device 904 through a network 912, such as a Wide Area Network (WAN), a Local Area Network (LAN), etc., for example. The server device 910 is configured to identify one or more unique terms in the received user input and to generate a notification indicative of semantic concepts respectively associated with the unique terms.

In the example system 900, the server device 910 comprises a receiver 914, such as a network adapter, configured to receive user input from the client device 904 and an identification component 916 configured to identify one or more unique terms in the received user input. For example, in one embodiment, the identification component 916 is configured to compare the text of the received user input to a database (not illustrated) of predetermined unique terms to identify unique terms in the received user input. It will be appreciated that other analytic and/or iterative techniques for identifying unique terms that are known to those skilled in the art are also contemplated. For example, in another embodiment, the identification component 916 is configured to identify unique terms based upon their capitalization in the received user input.

The example server device 910 also comprises a search component 918 configured to generate a query based upon the identified unique term and to identify at least one semantic concept associated with the unique term. For example, in one embodiment, the search component 918 is configured to search a semantic concept storage component 920 (e.g., a database) that is configured to store one or more semantic concepts and to locate at least one semantic concept stored in the semantic concept storage component 920 that is associated with the unique term. For example, where the identified unique term is "Yellowstone National Park," the search component may locate a semantic concept (e.g., a URN, URL, etc.) that is directed to the official Yellowstone National Park webpage and/or to a wiki article about Yellowstone National Park.

The search component 918 is also configured to send the search results of the search (e.g., the identified semantic concepts) to a notification component 922 that is configured to generate a notification based upon the identified semantic concepts. It will be appreciated that the notification may comprise the semantic concepts themselves (e.g., the notification may comprise URLs to the Yellowstone National Park webpage) and/or it may comprise information on how to locate the semantic concept. For example, where the semantic concept is inaccessible without proper credentials, the notification may comprise information on how a user (e.g., with proper credentials) can access the semantic concept.

The notification component 922 is also configured to issue the notification (e.g., through the network 912) to the client device 904, and the client device 904 may be configured to display the notification to the user 902 on the monitor 906 through the document creation interface 908, for example.

In one embodiment, before the semantic concept is associated with the unique term (e.g., before the semantic concept is inserted into the document as an annotation to the unique term), a user selects to associate the semantic concept with the unique term. In this way, the user (e.g., the author) has control over whether additional information related to the unique term is comprised in the document that the user is authoring, for example. Thus, in one embodiment, the client device 904 is configured to receive a selection of a semantic concept comprised in the notification from the user 902.

Once a selection is made, the client device 904 is configured to associate the selected semantic concept with the user input. For example, in one embodiment, the client device 904 comprises an annotation association component (not illustrated) that is configured to associate the selected semantic concept with the unique term. Stated differently, the client device 904 comprises a component that inserts the semantic concept into the document as an annotation to the unique term that is comprised in the received user input. In this way, when a reader of the document selects, hovers over, etc. the unique term, an annotation may appear providing further detail with respect to the unique term.

It will be appreciated while the association of the selected semantic concept with the user input is described with respect to the client device 904 (e.g., the client device 904 performs the association), in another embodiment, the server device 910 performs that association. Thus, in one example, the annotation association component may be comprised in the server device 910 as opposed to the client device 904 as described above.

It will be appreciated that in some circumstances, such as when a term is infrequently used, no semantic concepts may be associated with a unique term. Thus, in one embodiment, the document creation interface 908 is configured to display a field (e.g., as illustrated in FIG. 5) for creating a new semantic concept. In this way, the user can create a new semantic concept where no results were returned from the query and/or where the results were undesirable to the user 902. It will be appreciated that when a new semantic concept is created, the semantic concept may be associated with the identified unique term and stored (e.g., in the semantic concept storage component 920) for later use by the user 902 and/or another user, for example.

Figure 10:
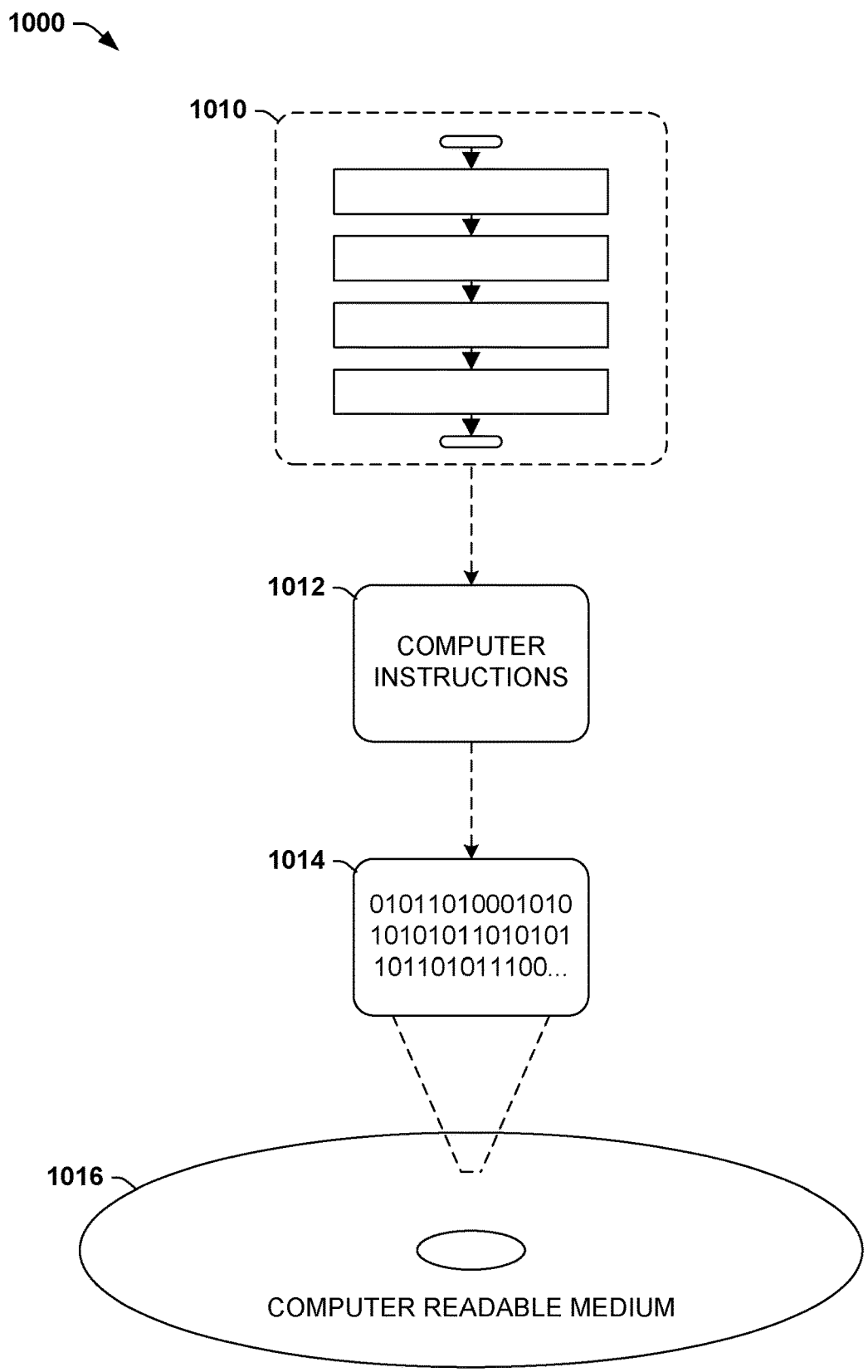
FIG. 10 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 10, wherein the implementation 1000 comprises a computer-readable medium 1016 (e.g., a CD-R, DVD-R, or a platter of a hard disk drive), on which is encoded computer-readable data 1014. This computer-readable data 1014 in turn comprises a set of computer instructions 1012 configured to operate according to one or more of the principles set forth herein. In one such embodiment 1000, the processor-executable computer instructions 1012 may be configured to perform a method 1010, such as the exemplary method 100 of FIG. 1 and/or exemplary method 800 of FIG. 8, for example. In another such embodiment, the processor-executable instructions 1012 may be configured to implement a system, such as at least some of the exemplary system 900 of FIG. 9, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 11:
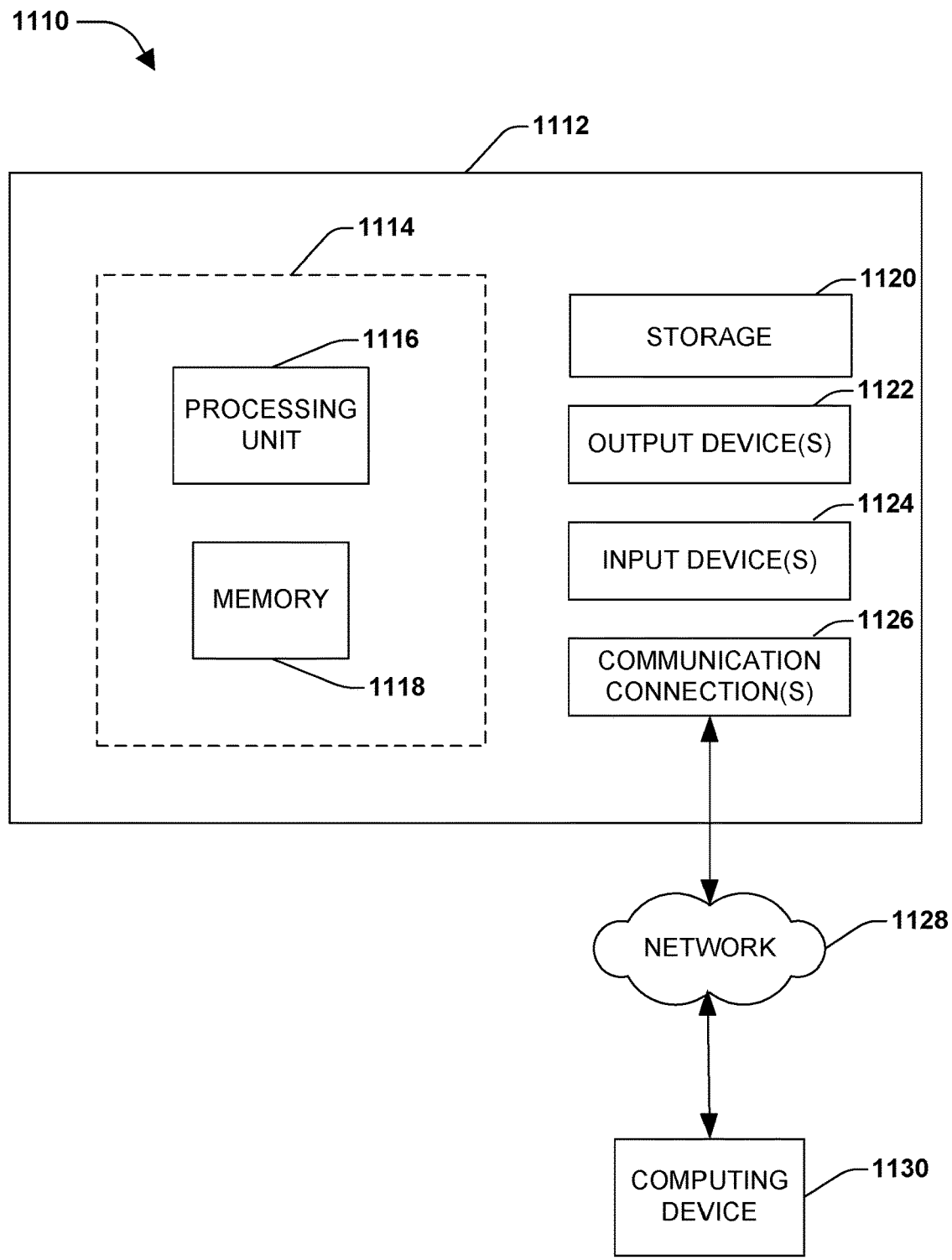
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1110 comprising a computing device 1112 configured to implement one or more embodiments provided herein. In one configuration, computing device 1112 includes at least one processing unit 1116 and memory 1118. Depending on the exact configuration and type of computing device, memory 1118 may be volatile (such as RAM, for example), non-volatile (such as ROM, flash memory, etc., for example) or some combination of the two. This configuration is illustrated in FIG. 11 by dashed line 1114.

In other embodiments, device 1112 may include additional features and/or functionality. For example, device 1112 may also include additional storage (e.g., removable and/or non-removable) including, but not limited to, magnetic storage, optical storage, and the like. Such additional storage is illustrated in FIG. 11 by storage 1120. In one embodiment, computer readable instructions to implement one or more embodiments provided herein may be in storage 1120. Storage 1120 may also store other computer readable instructions to implement an operating system, an application program, and the like. Computer readable instructions may be loaded in memory 1118 for execution by processing unit 1116, for example.

The term "computer readable media" as used herein includes computer storage media. Computer storage media includes volatile and nonvolatile, removable and non-removable media implemented in any method or technology for storage of information such as computer readable instructions or other data. Memory 1118 and storage 1120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1112. Any such computer storage media may be part of device 1112.

Device 1112 may also include communication connection(s) 1126 that allows device 1112 to communicate with other devices. Communication connection(s) 1126 may include, but is not limited to, a modem, a Network Interface Card (NIC), an integrated network interface, a radio frequency transmitter/receiver, an infrared port, a USB connection, or other interfaces for connecting computing device 1112 to other computing devices. Communication connection(s) 1126 may include a wired connection or a wireless connection. Communication connection(s) 1126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1112 may include input device(s) 1124 such as keyboard, mouse, pen, voice input device, touch input device, infrared cameras, video input devices, and/or any other input device. Output device(s) 1122 such as one or more displays, speakers, printers, and/or any other output device may also be included in device 1112. Input device(s) 1124 and output device(s) 1122 may be connected to device 1112 via a wired connection, wireless connection, or any combination thereof. In one embodiment, an input device or an output device from another computing device may be used as input device(s) 1124 or output device(s) 1122 for computing device 1112.

Components of computing device 1112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1112 may be interconnected by a network. For example, memory 1118 may be comprised of multiple physical memory units located in different physical locations interconnected by a network.

Those skilled in the art will realize that storage devices utilized to store computer readable instructions may be distributed across a network. For example, a computing device 1130 accessible via a network 1128 may store computer readable instructions to implement one or more embodiments provided herein. Computing device 1112 may access computing device 1130 and download a part or all of the computer readable instructions for execution. Alternatively, computing device 1112 may download pieces of the computer readable instructions, as needed, or some instructions may be executed at computing device 1112 and some at computing device 1130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system comprising:
    at least one processor; and
    a memory coupled to the at least one processor, the memory for storing instructions which, when executed by the one or more processors, performs a method for adding semantic concepts to a document, the method comprising:
        parsing the document to generate a set of terms;
        evaluating the set of terms to identify a first unique term in the document, wherein the evaluating comprises at least one of comparing the set of terms to a set of predefined terms and identifying one or more proper names in the set of terms;
        generating a query to identify whether the first unique term is associated with one or more semantic concepts;
        determining, based on the query, the first unique term is not associated with a semantic concept;
        providing an option to create a new semantic concept for the first unique term;
        receiving a selection to create the new semantic concept;
        receiving the new semantic concept;
        associating the new semantic concept with the first unique term; and
        storing the new semantic concept, such that an indication of the new semantic concept is visible in the document after the association.

2. The system of claim 1, wherein the new semantic concept is at least one of a URL and a URN.

3. The system of claim 1, the method further comprising receiving input via a document creation interface associated with the document, wherein the input corresponds to one or more portions of the document, and wherein the option to create a new semantic concept is presented to a user via the document creation interface.

4. The system of claim 1, wherein associating the new semantic concept comprises annotating the first unique term with an indication of the new semantic concept.

5. The system of claim 1, wherein identifying the first unique term comprises evaluating the document in real-time as the document is authored by a user.

6. The system of claim 1, wherein identifying the first unique term comprises evaluating the document in response to at least one of an on-demand request by a user and an elapse of a period of time.

7. The system of claim 1, wherein storing the new semantic concept comprises adding the new semantic concept to a data store, such that the new semantic concept will appear in a set of semantic concepts for the first unique term when the first unique term is subsequently identified in one or more documents.

8. The system of claim 1, wherein the first unique term is or refers to a noun.

9. The system of claim 1, wherein determining the first unique term is not associated with a sematic concept comprises using the query to search a database of semantic concepts.

10. The system of claim 1, wherein determining the first unique term is not associated with a sematic concept comprises using the query to search a database of semantic concepts.

11. A method for adding semantic concepts to a document, the method comprising:
parsing the document to generate a set of terms;
evaluating the set of terms to identify a first unique term in the document, wherein the evaluating comprises at least one of comparing the set of terms to a set of predefined terms and identifying one or more proper names in the set of terms;
generating a query to identify whether the first unique term is associated with one or more semantic concepts;
determining, based on the query, the first unique term is not associated with a semantic concept;
providing an option to create a new semantic concept for the first unique term;
receiving a selection to create the new semantic concept;
receiving the new semantic concept;
associating the new semantic concept with the first unique term; and
storing the new semantic concept, such that an indication of the new semantic concept is visible in the document after the association.

12. The method of claim 11, the method further comprising receiving input via a document creation interface associated with the document, wherein the input corresponds to one or more portions of the document, and wherein the option to create a new semantic concept is presented to a user via the document creation interface.

13. The method of claim 11, wherein determining the first unique term is not associated with a semantic concept comprises:
generating a set of queries; and
determining the set of queries generated no semantic concepts associated with the first unique term.

14. The method of claim 11, wherein associating the new semantic concept comprises annotating the first unique term with an indication of the new semantic concept.

15. The method of claim 11, wherein identifying the first unique term comprises evaluating the document in real-time as the document is authored by a user.

16. A system comprising:
at least one processor; and
a memory coupled to the at least one processor, the memory for storing instructions which, when executed by the one or more processors, performs a method for translating an expression, the method comprising:
identifying a first unique term in a document authored by a user;
determining a set of semantic topics associated with the first unique term;
creating a notification indicative of the set of semantic topics;
receiving a user selection of a semantic topic in the set of semantic topics;
determining the selected semantic topic is associated with a set of semantic concepts associated with the first unique term;
providing to the user a set of options, wherein the set of options comprises the set of semantic concepts and an option to create a new semantic concept for the first unique term;
receiving a selection to create the new semantic concept;
receiving the new semantic concept;
associating the new semantic concept with the first unique term; and
storing the new semantic concept, such that an indication of the new semantic concept is visible in the document after the association.

17. The system of claim 16, wherein identifying the first unique term comprises:
generating a set of queries;
submitting the set of queries to one or more data stores of semantic concepts; and
receiving the set of options from the one or more data stores of semantic concepts.

18. The system of claim 16, wherein a document creation interface includes into the set of options the option to create a new semantic concept for the first unique term, and wherein the document creation interface presents the set of options to a user.

19. The system of claim 16, the method further comprising:
determining a set of semantic topics associated with the first unique term;
creating a notification indicative of the set of semantic topics;
receiving a user selection of a semantic topic in the set of semantic topics;
determining the set of semantic concepts is associated with the selected semantic topic; and
including the selected of set semantic concepts in the set of options.

20. The system of claim 16, wherein storing the new semantic concept comprises adding the new semantic concept to a data store, such that the new semantic concept will appear in a set of semantic concepts for the first unique term when the first unique term is subsequently identified in one or more documents.

* * * * *